(12) United States Patent
Naudts

(10) Patent No.: US 6,349,515 B1
(45) Date of Patent: Feb. 26, 2002

(54) PARKING DEVICE FOR CYCLES

(76) Inventor: Patrick Naudts, Bundelgemsesteenweg 278 A B-9820, Merelbeke (BE)

( * ) Notice: Subject to any disclaimer, the term of this patent is extended or adjusted under 35 U.S.C. 154(b) by 0 days.

(21) Appl. No.: 09/509,029

(22) PCT Filed: Sep. 21, 1998

(86) PCT No.: PCT/BE98/00138

§ 371 Date: Sep. 5, 2000

§ 102(e) Date: Sep. 5, 2000

(87) PCT Pub. No.: WO99/15745

PCT Pub. Date: Apr. 1, 1999

(30) Foreign Application Priority Data

Sep. 19, 1997  (BE) .............................................. 9700763

(51) Int. Cl.⁷ ................................................. E04H 6/00
(52) U.S. Cl. ..................... 52/234; 52/174; 52/DIG. 14; 52/236.4; 52/79.2; 52/79.4
(58) Field of Search ................................. 52/79.2, 79.4, 52/DIG. 14, 574, 236.4, 3, 4, 5, 234, 174

(56) References Cited

U.S. PATENT DOCUMENTS

| | | | | |
|---|---|---|---|---|
| 3,805,461 A | * | 4/1974 | Jagoda | 52/79 |
| 3,835,601 A | * | 9/1974 | Kelbish | 52/79 |
| 3,906,691 A | * | 9/1975 | Grenet | 52/237 |
| 3,949,528 A | * | 4/1976 | Hartger et al. | 52/79 |
| 3,996,704 A | * | 12/1976 | Huey | 52/79 |
| 4,118,905 A | * | 10/1978 | Shelley | 52/79.2 |
| 4,894,961 A | * | 1/1990 | Robbins | 52/79.4 |
| 4,983,089 A | * | 1/1991 | Rose | 52/79.5 |

* cited by examiner

Primary Examiner—Carl D. Friedman
Assistant Examiner—Dennis L. Dorsey
(74) Attorney, Agent, or Firm—Pauly Peterson Kinne & Erickson

(57) ABSTRACT

A parking device for two-wheelers, the device having at least a series of parking elements with mutually adjacent parking elements. Each parking element has an enclosed space for receiving individually a single two-wheeler, so as to form individual parking cells for two-wheelers isolated from one another. Each cell can be closed for enclosing the space taken up by the cell.

26 Claims, 5 Drawing Sheets

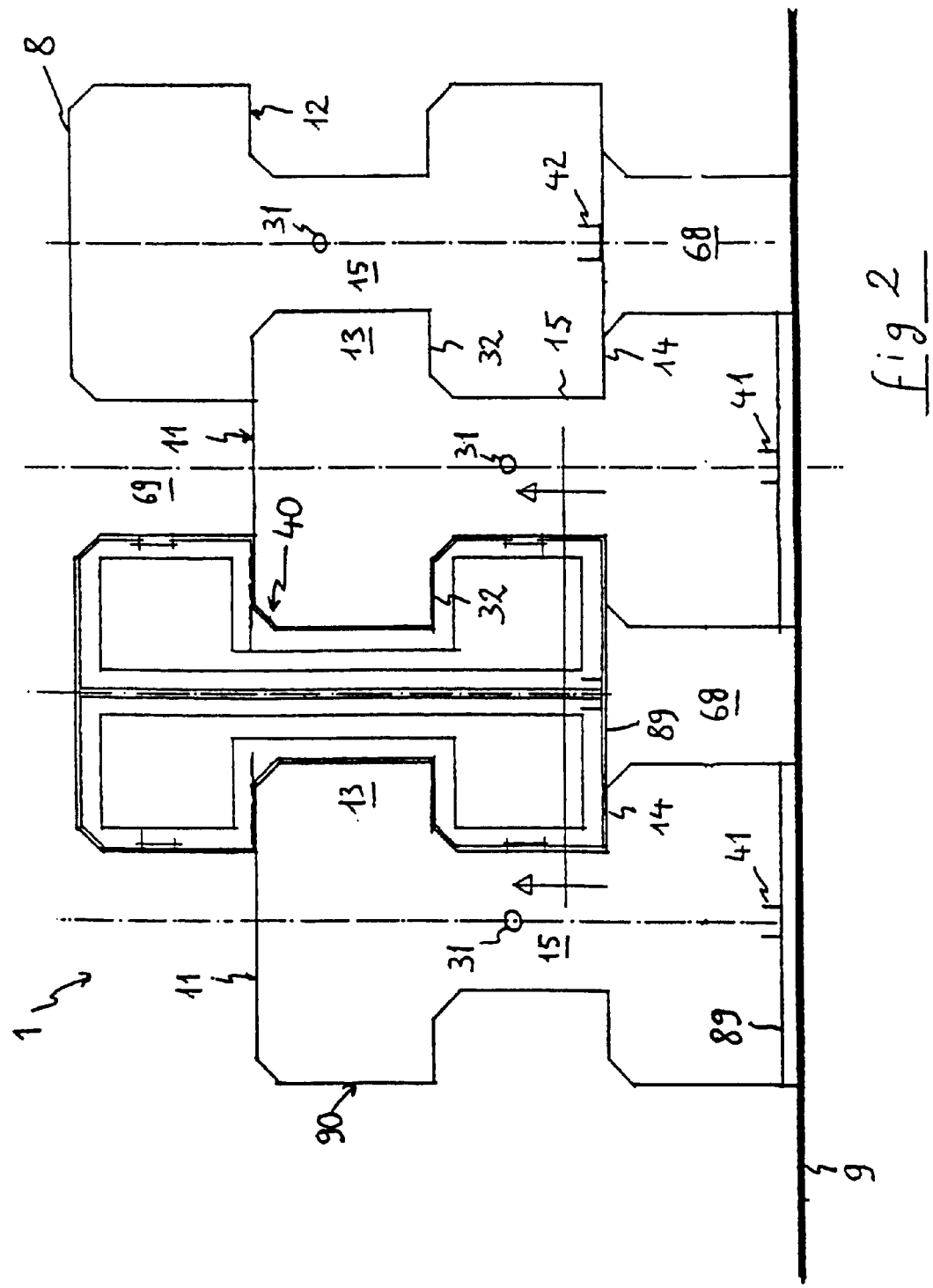

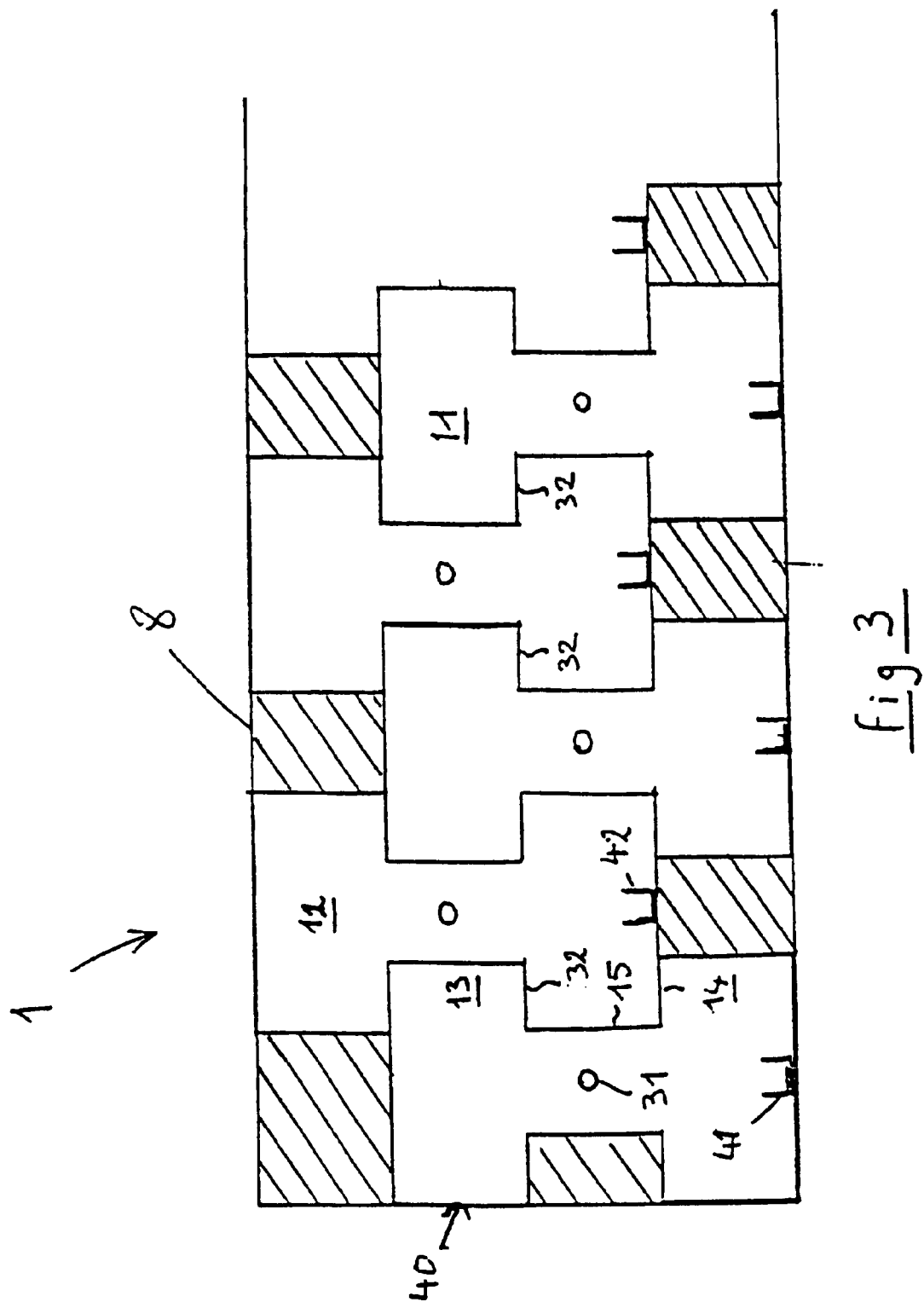

PARKING DEVICE FOR CYCLES

BACKGROUND OF THE INVENTION

1. Field of the Invention

This invention relates to a parking device for two-wheelers, especially for bicycles, mopeds, motorbikes and similar vehicles.

2. Description of Related Art

It is well known that urban traffic is constantly increasing and now reaching critical levels, especially in large urban centers, where increased vehicle concentrations cause enormous lines of cars. This causes a serious loss of time for road users and ends up being a major economic loss for society as a whole.

To counter this troublesome situation, some users are giving up their vehicle to replace it with two-wheelers, which enables them to weave more rapidly between the larger vehicles. This type of user, however, encounters the serious problem of a lack of equipment in most urban centers, restricting accommodations for a large number of two-wheelers. This contrasts with the importance of the measures adopted by the authorities for parking facilities for four-wheeled vehicles.

A large number of locations and public buildings, like schools, train stations, even businesses, have spaces reserved for two-wheeled vehicles, which contain parking supports for two-wheelers of the bicycle rack type, for example, and which enable the user to park and secure a two-wheeler, as with a four-wheeled vehicle. To prevent the two-wheeler from being stolen, the user generally uses a padlock, which he locks when he is absent. Unfortunately, this does not prevent theft from frequently occurring, because this protection can be overcome fairly easily by the dishonest criminal. The problem of safety therefore remains. With parking devices of this type, the two-wheelers are often not arranged in an orderly manner, which creates a general disorderly appearance in the parking zone. The two-wheelers are sometimes removed abruptly from their position, which can cause scratches and other damage to neighboring two-wheelers. These shortcomings deter use of a two-wheeler, so that the problem of the aforementioned lines of traffic still exists.

SUMMARY OF THE INVENTION

It is one object of this invention to provide for an urban environment a satisfactory solution to the aforementioned problem, so that the vehicle traffic density can be reduced. This invention seeks to provide such a solution.

The measures proposed for this purpose are defined in the claims and the specification. With this invention, an effective means of parking for two-wheelers is obtained both in terms of protecting two-wheelers against weather, abrupt or clumsy handling during parking, and vandalism, and for the protection against theft, while imparting a neat and orderly appearance to the urban environment. The advantages stemming from the measures thus proposed are explained in the following description, of some practical examples of a parking device for two-wheelers according to this invention, which is illustrated in the drawings.

BRIEF DESCRIPTION OF THE DRAWINGS

FIG. 2 illustrates a schematic view of another embodiment of the device according to FIG. 1;

FIG. 3 illustrates a view similar to FIG. 2 of another embodiment of the device according to this invention;

DESCRIPTION OF PREFERRED EMBODIMENTS

The parking device described below pertains, in general, to two-wheelers, even to three-wheeled vehicles. However, in the interest of clarity, the description provided here will focus upon the particular case of mopeds or bicycles.

Figure 1:
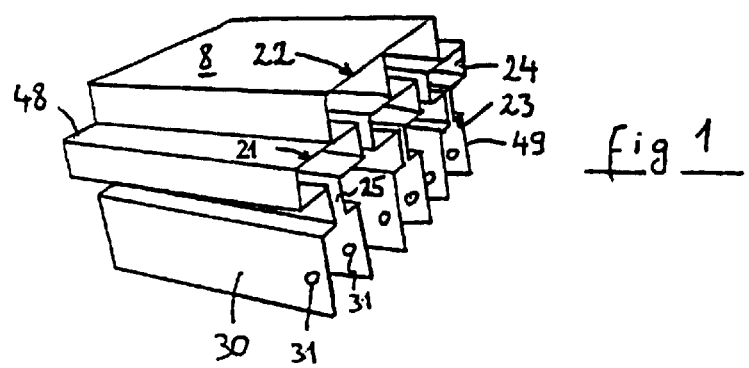
FIG. 1 illustrates a perspective view of a parking device according to the invention, containing some modules.

The parking device 1 illustrated in FIG. 1 includes a series of cells 11, 12 that are mutually connected in alignment. Each cell forms an individual parking compartment intended to receive a bicycle 2. The cells are advantageously fully closed, so as to protect the bicycle. An access opening is provided, however, to introduce the bicycle into the cell. A compartment or box for the bicycle is thus obtained. Openings 31 are advantageously made in the walls of the cells, to permit ventilation within the cells. Thus the bicycles in the protected parking are protected from both weather and theft.

The cells 11, 12 are arranged to mutually overlap, positioned in two series of mutually interpenetrating cells. Thus, each cell 11 of a first series is surrounded by cells 12 belonging to the other series, the cells thus being arranged mutually offset according to a scheme of alternation of first and second cells, respectively, as shown in FIG. 2.

Each cell has narrow sections 15 forming the core of the cell and ending on each end with widened sections 13 and 14 that protrude relative to section 15. The protruding sections of the first cells are intended to be nested between the protruding sections of the second adjacent cells. Because of this particular arrangement, a substantially increased parking capacity per unit of occupied surface is obtained.

The cells as shown thus advantageously have a profiled section essentially in the shape of an I, where each cell or compartment has a base section and widened tops, each connected to the narrow or central section. This configuration of cells is particularly well adapted to that of bicycles, as shown in FIG. 3. In effect, the widened sections 13, 14 are perfectly suited for the parts of the bicycle that protrude laterally, like the handlebars 3 on the upper side and the pedals 4 on the lower side. The narrow part 15, as such, is suited as a means to guide the frame proper 5 of the bicycle.

The depth and height of the cells at least slightly exceed the length of the standard bicycle. Thus, because of appropriate dimensioning of the cells, a particularly suitable parking space is obtained for parking or alignment of bicycles. The walls 30 of the cells overall thus enclose the different parts of the bicycle, so as to form, if necessary, a support surface for them. This specific structure of the cells favors maintenance of the bicycles in a good state of preservation, where the risk of degradation of the bicycles is substantially reduced.

Moreover, because of the combined effect of the shape of the cells 11, 12 with their specific order in parallel with the other cells, there is no loss of space due to haphazard arrangement of the bicycles. The space saving achieved will be even greater with the overlapping arrangement of the cells.

Figure 4:
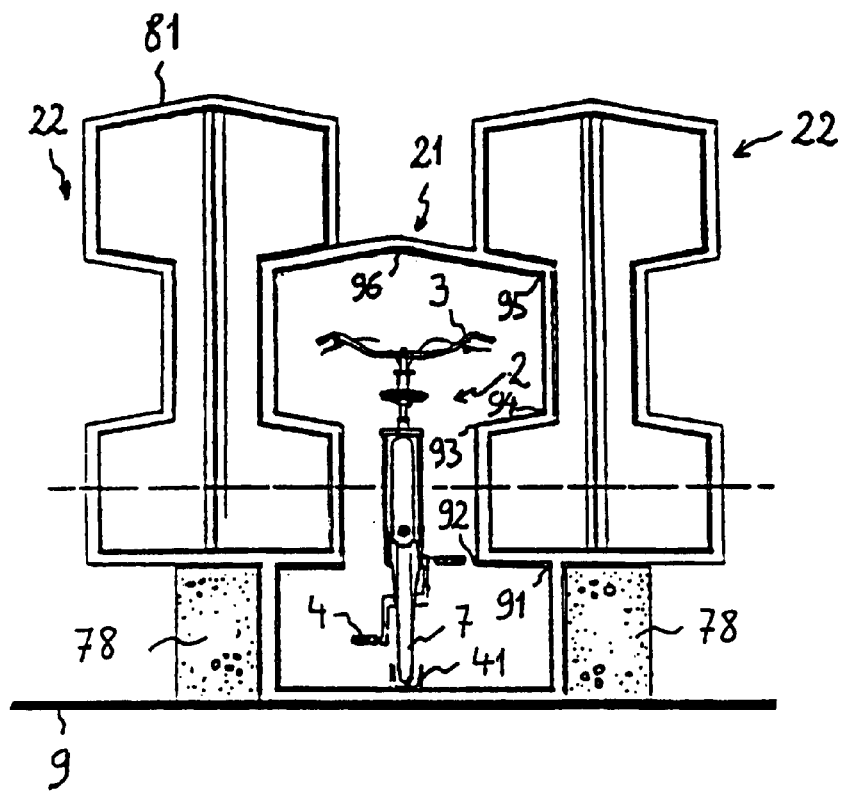
FIG. 4 illustrates a view similar to FIG. 2 of yet another embodiment of the device according to this invention.
Figure 5:
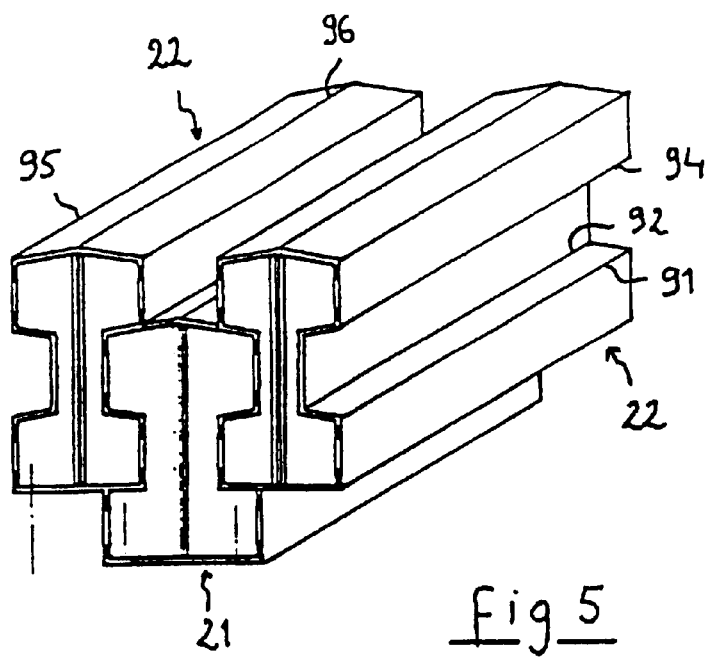
FIG. 5 illustrates a perspective view of the device according to FIG. 4.

The cells 11, 12 advantageously all have the same I cross section as shown in FIG. 2, forming a slight variant of the device with cells 21, 22 according to FIG. 4, which is more adapted for use for motorcycles, especially because of the greater width dimensions of the different sections. One advantage of an essentially identical version of cells 11, 12 is that it offers standardization of the cells, which allows a simplified manufacturing process, permitting easier automation.

Moreover, this permits better interchangeability of the cells in a modular design of the parking device in its entirety. The modular design of the device facilitates disassembly and reassembly at another site, according to specific needs. This favors intensive use of these parking devices in the case of events limited in time, at which large numbers of people congregate, like concerts, open air festivals, large exhibitions, etc.

The modular design of the cells also offers an advantage of being able to adapt the number of available cells on a site as a function of temporary needs. The length of the parking device is therefore variable at any time. Moreover, the cells are pliable and portable, which further promotes use on such occasions.

As shown in FIG. 2, the residual spaces 68, 69 are available between the widened sections 13, 14 of successive cells pertaining to the same lower or upper row. The spaces 68, 69 can be usefully employed, an additional stowage space that can be closed either together with the cell to which it is attached, or separately from it. In the latter case, a corresponding additional closure is provided. This space, preferably the upper space 69, can serve, for example, for stowing of a helmet, since use of helmets are becoming more and more common including amongst cyclists.

The lower additional spaces 68 are preferably attached to concrete blocks 78 shown in FIG. 4, to which the cells are attached by appropriate means of attachment, like anchoring screws. This permits the parking device 1 to be anchored to the ground 9, which substantially increases its stability.

The overall structure of the parking device is self-supporting. To guarantee the required stability, the number of cells of the entire parking device will be odd, as apparent in the drawings, which imparts a symmetric configuration in stable equilibrium.

The cells are made from galvanized sheet, for example, which is folded along folding lines 91, 92, 93, 94, 95, 96, as shown in the drawings. These characteristic folding zones, with nesting of successive cells, impart good stability to the assembly. However, the anchoring capability represents an additional stability factor.

The walls 30 forming each cell can be made with edges that overlap, through which the walls can be mutually assembled in a screw assembly, for example.

In order to improve the use convenience of the parking device, each cell has on its base a means of guiding 41, 42, preferably centrally along the longitudinal direction of the cell intended to receive bicycle 2. This means of guiding 41, 42 can be formed by a rail, for example, or even by a folded median zone for this purpose in the base sheet 89, which ensures a handy and automatically median arrangement of the bicycle.

A holding device is advantageously provided in the means of guiding 41, 42 at the height of the entry opening 90 of each cell. This means, which is preferably lockable, permits securing the bicycle in place after its introduction to the cell. This means of holding is particularly indicated when the means of guiding 42 just mentioned has a certain slope a, as is the case for cells 12, 22 of the upper series, thus facilitating introduction of the bicycles into the upper cells, as is apparent in FIG. 9. In the cells of the lower series 11, 21, the means of guiding 41 extend along their base 89.

Figure 9:
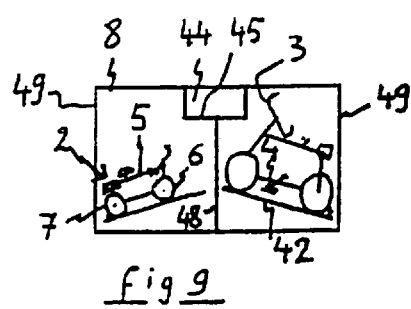
FIG. 9 illustrates a particular arrangement of cells for a double parking device.

FIG. 9 shows a variant of the parking device, in which it has a shoulder 44 at the bottom. The shoulder is constructed so that it provides a support surface 45. The support surface 45 is advantageously flat and horizontal. According to its height relative to the ground, on which the device 1 rests, the support surface 45 can serve as a bench for sitting or as a support for flower pots. Thus, the assembly can be perfectly integrated in the urban environment in which it is located. This also results in clean lines of the device, permitting harmonious integration in the present urban setting.

To ensure regular removal of rain water, the surface of top 8 of the parking device is slightly sloped. When the cells have the shoulder, the slope faces them, the support surface 45 being slightly sloped outward avoids any stagnation of water on these surfaces. Otherwise, the inclination 81 will start from the longitudinal axis of the top, toward the lateral sides, as shown in FIGS. 3 and 4.

Figure 10:
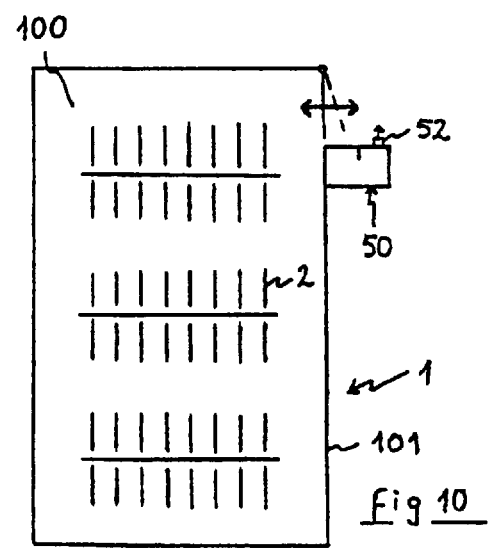
FIG. 10 illustrates a schematic plan view of another arrangement of multiple parking devices.

Preferably, the cells are equipped with a means of closure 40 of the door type, permitting individual closure of each cell. The shape of the door corresponds essentially to that of the access opening cross section 90 of the cell. The doors are advantageously designed to slide, especially in the direction of arrow F in the plane of elevation of the parking device. This causes minimal space requirements and thus requires minimal space for opening of the doors of the cells, which proves to be particularly advantageous in the case of a grid arrangement 100 of multiple parking devices 1, as shown in FIG. 10.

Figure 6:
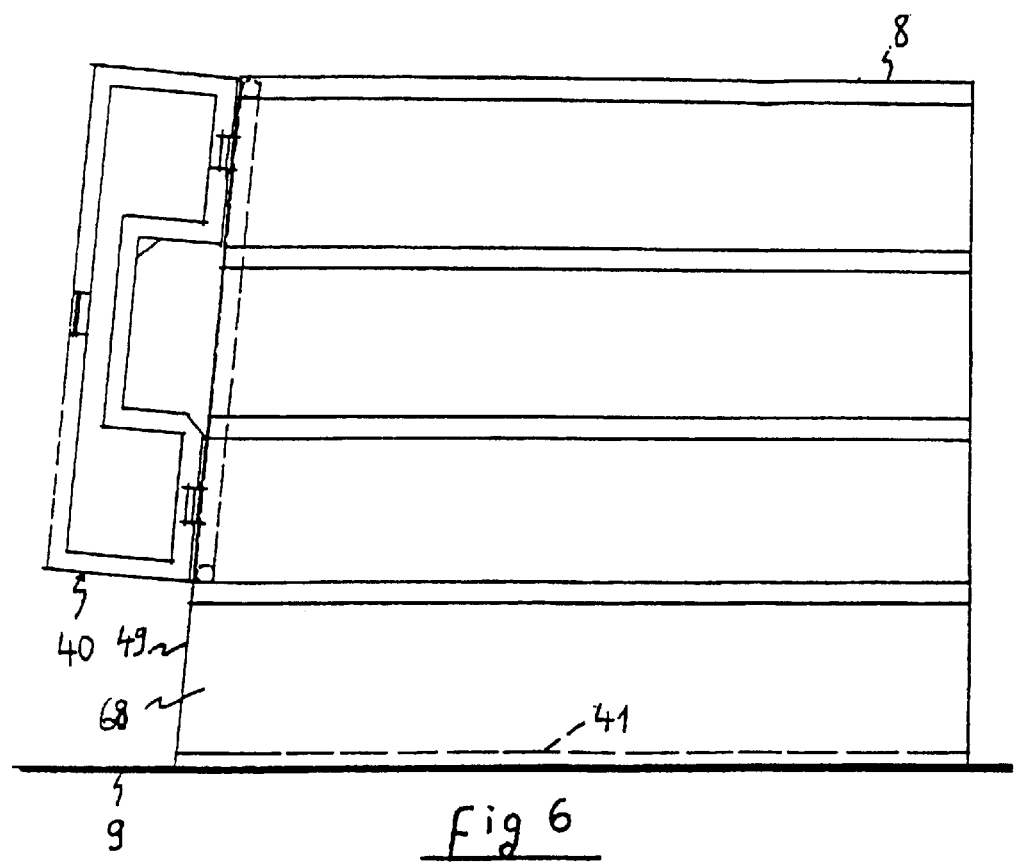
FIG. 6 illustrates a lateral cross section of the device shown in FIG. 4, with an open door.

FIG. 6 shows an embodiment in which the access surface 49 of the cell is sloped to the rear. This offers the advantage that the access door 40 will close itself after having been opened, under the influence of gravity. The door ends up in a closure device, forming a lock that will be locked. It will then only be unlocked after activation by a user card, which permits reopening of the door only from this moment.

Figure 7:
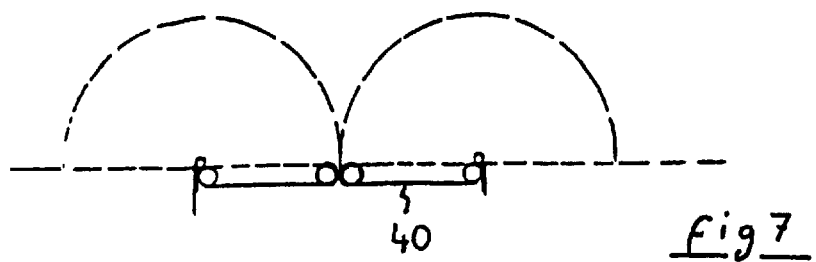
FIGS. 7 and 8 illustrate embodiments of functioning schemes of the door of the parking device.
Figure 8:
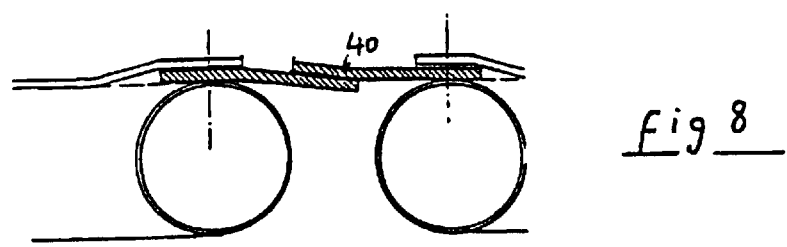

However, pivoting or even tilting doors can also be used, as shown in FIGS. 7 and 8. The pivoting doors are attached on hinges on a corresponding side of the access opening of each cell.

The tilting doors are attached above the upper side of each cell.

The means of closure 40 impart to the parking device, in addition to its function of good preservation of the bicycle contained in it, effective security against vandalism and theft.

Safety against theft in a parking area can be considerably reinforced by incorporation of a control unit 50 at the entry to the parking area 100, in which parking devices 1 are arranged. The parking area in this case will be closed by an enclosure 101. The control unit permits individual control of the means of closure, through which opening of these means can be controlled selectively.

The means of closure 40 can be activated by control devices prescribed for this purpose, like small motors that are housed in the available spaces 68, 69 in the parking device. Each door is activated by its motor, which in turn is controlled by the central unit. Thus, locking of the doors can be done by using a microchip.

The central unit comprises a processor and can be controlled directly by the cyclist. To make it more convenient, it is equipped with a display screen that can provide any type of useful information to the user, like the intended parking cell. It is also advantageously equipped with a programming keyboard and card reader, as well as a power supply. A modem is provided on the microchip module, intended to permit communication with the financial institution, through which payment will be made. A second modem can also be provided to monitor the system remotely and intervene, if necessary.

Functioning of the parking device is explained below. When the cyclist wishes to park a bicycle, the bicycle is positioned in front of an available box or cell and controls its opening by means of a chip card. The user then parks the bicycle and, if necessary, stows other personal effects 99 in the space or spaces provided for this purpose. The user then controls closure of the door or doors and withdraws the chip card. When the cyclist wishes to recover the bicycle, the cyclist controls opening of the door of the appropriate cell by means of the chip card. The card is debited the amount corresponding to the duration of occupation of the cell, in similar fashion to the procedure followed for vehicle parking. The cyclist withdraws the bicycle and effects from the cell, closes the door and only then can the cyclist withdraw the card from the parking device. As a result, the cells are always closed, whether occupied or empty. The result of this is that acts of vandalism are strongly discouraged, at least within the cells.

An example of functioning of the device as a more advanced system is given below. The central processor unit (CPU) directs and monitors all the operations. The manager of a parking site can perform priority and necessary actions by means of a manager card, which is the manager's own, and for which the manager is the only authorized person, or with a PC with appropriate software. The priority actions are defined as being: opening of boxes or cells to check their contents; assistance to a cyclist who has lost a card; search for occupied cells exceeding a recommended threshold; and/or placing cells out of service or in service.

The optional actions indicated below can be added to these priority and necessary actions: establishment of statistics concerning level of occupation of cells, permitting evaluation of the need to increase or reduce the parking capacity; reservation of a cell or cells for a business client, as is done for vehicles now; and/or presetting of the waiting time for closure of the door of the cell or later opening of it after closure.

The manipulation by the user-cyclist, resulting in action of the system, can include: parking one or more bicycles in a corresponding number of cells; adding baggage 99 later to the cell, with the possibility of the user-cyclist choosing the cell if the user occupies several; and/or withdrawal of the bicycle with the same possibility of choice, accompanied by establishment of the account, with deduction in the event of insufficient balance on the card.

In the state of rest of the system, the cells are all closed. In the state of complete closure of the door, contact will be established and a signal will be sent to the central unit. When this reads this signal, an availability message of the cell, such as "free", will be displayed on the door or any other useful information support.

What is claimed is:

1. A parking device for two-wheelers, comprising at least one series of parking elements having mutually adjacent parking elements, each of the parking elements comprising a closed space individually receiving a single two-wheeler of the two-wheelers, forming individual parking cells for the two-wheelers that are mutually isolated, the parking cells are arranged in a first series and a second series, the parking elements of the first series alternating with and being vertically staggered with respect to the parking elements of the second series, the parking cells of the first series nested at least partially within the parking cells of the second series, and a closure for each cell permitting closure of the closed space that it encloses.

2. A parking device according to claim 1, wherein the parking cells each have at least one widened section (13, 14) protruding relative to at least one connected narrow section (15), said at least one widened section of the cell is capable of nesting with the corresponding narrow sections of the cells adjacent to the at least one widened section.

3. A parking device according to claim 1, wherein each of the parking cells has a cross section in a form of an I.

4. A parking device according to claim 1, wherein upper and lower residual spaces (68, 69) are between adjacent ones of the parking cells.

5. A parking device according to claim 4, wherein the lower residual spaces (68) are at least partially occupied by ballast blocks (78) arranged at least at a height of longitudinal ends of the cells to stabilize the parking device (1).

6. A parking device according to claim 5, wherein an attachment anchors the parking device to ballast blocks.

7. A parking device according to claim 5, wherein the ballast blocks are made of concrete.

8. A parking device according to claim 4 wherein the residual upper spaces (69) are used to stow accessory effects of a user of the parking cell corresponding to the parking cell below one of the residual upper spaces (69).

9. A parking device according to claim 1, wherein a space between the first series and the second series does not exceed an order of magnitude of a radius of one of wheels (7) of one of the two-wheelers.

10. A parking device according to claim 1, wherein the closure (40) is formed by a lockable door.

11. A parking device according to claim 10, wherein the lockable door pivots at an access opening (90) of one of the parking cells.

12. A parking device according to claim 10, wherein the lockable door slides in a direction parallel to a plane of the access opening (90).

13. A parking device according to claim 4, wherein residual spaces (68, 69) of the parking cells are selectively lockable.

14. A parking device according to claim 10, wherein the lockable door is controlled individually from a central control unit (50).

15. A parking device according to claim 10, wherein the lockable door is controllable individually by a user.

16. A parking device according to claim 10, wherein an access card is used to open the lockable door.

17. A parking device according to claim 14, wherein the central control unit (50) is operable directly by a user.

18. A parking device according to claim 14, wherein the central control unit (50) is indicatable to a user an assigned cell and opens the closure (40).

19. A parking device according to claim 1, wherein each of the parking cells (11, 12; 21, 22) has a guide (41, 42, 43) arranged longitudinally near a center of a base (89) of one of the parking cells.

20. A parking device according to claim 19, wherein the guide (41) of the first cells (11) is essentially parallel to a base, and the guide (42) of second cells (12) has a slope ($\alpha$) with respect to the base.

21. A parking device according to claim 1, wherein a rear side (48) of the parking device has a shoulder (44) forming a support surface (45).

22. A parking device according to claim 1, wherein outside surfaces of walls (30) of the parking device display information.

23. A parking device according to claim 22, wherein the outside surfaces are coated with a layer of anti-graffiti product.

24. A parking device according to claim 1, wherein the parking device is modular.

25. A parking device according to claim 1, wherein the parking device is pliable.

26. A parking device according to claim 1, wherein the parking device is portable.

* * * * *